3,845,069
1-(2-BENZOTHIAZOLYL)-1-ETHYL-3-
METHYL-UREA
Werner Schafer, Leverkusen, Klaus Sasse, Schildgen, and Ludwig Eue and Robert R. Schmidt, Cologne, Germany, assignors to Bayer Aktiengesellschaft, Leverkusen, Germany
No Drawing. Filed Aug. 9, 1972, Ser. No. 279,115
Claims priority, application Germany, Aug. 19, 1971, P 21 41 468.6
Int. Cl. C07d 91/44
U.S. Cl. 260—305                                    1 Claim

ABSTRACT OF THE DISCLOSURE 1-(2-benzothiazolyl)-1,3-dialkyl-ureas of the formula:

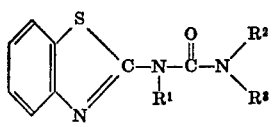

in which $R^1$ is alkyl of from 2 to 5 carbon atoms;
$R^2$ is hydrogen or alkyl of from 1 to 3 carbon atoms; and
$R^3$ is alkyl of from 1 to 3 carbon atoms;

are remarkably active herbicides well suited for selective herbicidal uses because of their high tolerance by plants.

---

The present invention relates to certain new 1-(2-benzothiazolyl)-1,3-dialkyl-urea compounds, to herbicidal compositions containing them and to their use as herbicides.

It is known that 1-(2-benzothiazolyl)-1,3-dimethylurea (hereinafter referred to as Compound A) possesses herbicidal properties (see U.S. Pat. No. 2,756,135).

The present invention provides 1-(2-benzothiazolyl)-1,3-dialkyl-ureas of the formula

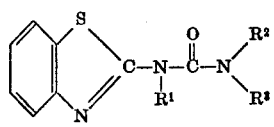

in which $R^1$ is alkyl of from 2 to 5 carbon atoms;
$R^2$ is hydrogen or alkyl of from 1 to 3 carbon atoms; and
$R^3$ is alkyl of from 1 to 3 carbon atoms.

Surprisingly, the 1-(2-benzothiazolyl)-1,3-dialkylureas of the formula (I) display a better herbicidal action than Compound A, which is chemically the most closely related active compound having a similar mode of action. Above all, however, the active compounds according to the invention are considerably better tolerated by crop plants, for example maize, wheat, barley, oats, peas and beans (Phaseolus) than the previously known active Compound A. It is particularly surprising that when applying the active compounds according to the invention in the post-emergence process to beets, no damage or only very slight damage is found, but in the case of the previously known active Compound A severe damage or total destruction of the beets occurs. The active compounds according to the invention can therefore, in contrast to the active Compound A, be employed for the selective combating of weeds in beets. The active compounds according to the invention hence represent an enrichment of the art of combating weeds.

The invention also provides a process for the production of a urea of the formula (I) in which a 2-alkylamino-benzthiazole-(1,3) of the general formula

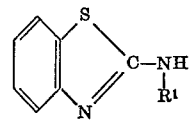

in which $R^1$ has the abovementioned meaning, (a) is reacted with an isocyanate of the general formula $$R^3-N=C=O \quad (III)$$

in which $R^3$ has the abovementioned meaning, optionally in the presence of a diluent, or (b) is reacted with phosgene (=$COCl_2$) and an alkylamine or dialkylamine of the general formula

in which $R^2$ and $R^3$ have the abovementioned meanings, in the presence of an acid-binding agent and optionally in the presence of a diluent.

If 2-ethylamino-benzthiazole-(1,3) and ethylisocyanate are used as the starting compounds, the course of the reaction according to process variant (a) can be represented by the following equation:

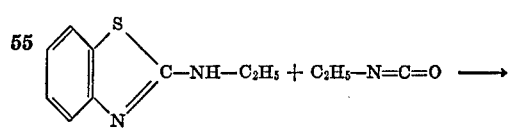

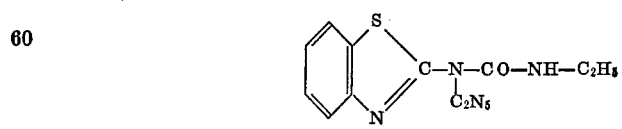

If 2-n-propylamino-benzthiazole-(1,3), phosgene and dimethylamine are used as the starting compounds, the course of the reaction according to process variant (b) can be represented by the following equation:

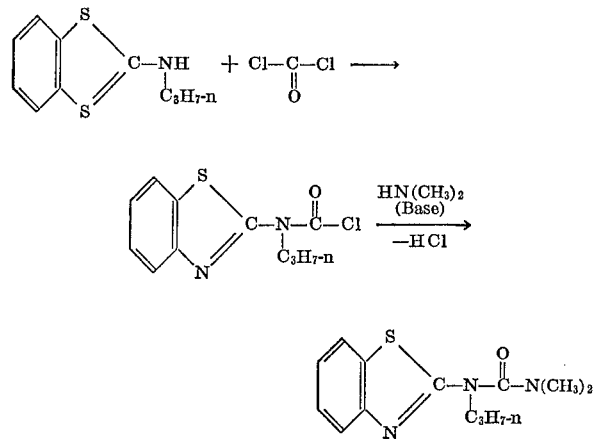

The following may be mentioned individually as examples of the 2-alkylamino-benzthiazoles-(1,3) to be used according to the invention:

2-ethylamino-benzthiazole-(1,3),
2-n-propylamino-benzthiazole-(1,3),
2-isopropylamino-benzthiazole-(1,3),
2-n-butylamino-benzthiazole-(1,3),
2-sec.-butylamino-benzthiazole-(1,3) and
2-isopentylamino-benzthiazole-(1,3).

Some of the compounds of the formula (II) are already known. Those which are still new can be prepared in the same manner as those already known, for example by reaction of 2-chloro-benzthiazole-(1,3) with alkylamines (compare Chemisches Zentralblatt *1924* I, page 2828) or by reaction of 1,3-benzthiazole-2-sulphonic acid with alkylamines (see Zhur. Obshchei Khim. *26*, 268–272 (1956), reviewed in Chem. Abstr. *50*, 14712h (1956)).

The isocyanates of the formula (III) and alkylamines or dialkylamines of the formula (IV) used as starting compounds are known.

The diluents to be used in the process of the invention include all inert organic solvents. Preferred diluents include hydrocarbons, such as benzene or toluene, ether, such as diethyl ether, dioxan and tetrahydrofuran, chlorinated hydrocarbons, such as methylene chloride, chloroform and carbon tetrachloride, ketones, such as acetone, esters, such as ethyl acetate, acetonitrile and dimethylformamide.

All customary acid-binding agents can be used as acidbinders. Preferred examples include alkali metal hydroxides, alkali metal carbonates and tertiary amines. The following may be mentioned individually as being particularly suitable: sodium hydroxide, sodium carbonate, triethylamine and pyridine.

The reaction temperatures can be varied over a wide range. In general, the reaction is carried out at from 0° to 140° C., preferably 10 to 120° C.

In carrying out the process according to the invention, approximately equimolar amounts of starting compounds are generally employed.

The reaction mixture may be worked up in the usual manner.

The following examples are illustrative of the preparation of the instant compounds:

Example 1—Preparation of 1-(2-benzothiazolyl)-1-ethyl-3-methyl-urea (a) According to process, variant (a), above.—

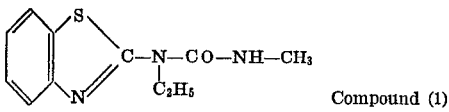

Compound (1)

24 g. of 2-ethylamino-benzothiazole-(1,3) were dissolved in 100 ml. of dimethylformamide; 8 ml. of methylisocyanate were added dropwise over the course of 5 minutes. In the course thereof, the temperature rose from 20 to 24° C. The mixture was warmed for half an hour to 100° C. and was then distilled *in vacuo* until free of solvent. The stiff oil which remained was recrystallized from white spirit. 27 g. of 1-(2-benzothiazolyl)-1-ethyl-3-methyl-urea were obtained in the form of white crystals of melting point 82–84° C.

(b) According to process variant (b).—44.5 g. of 2-ethylamino-benzothiazole-(1,3) were dissolved in 200 ml. of dioxan; 19.5 g. of phosgene were passed in at room temperature and phosgene was then passed over the mixture for a further 3 hours at the boil (93° C.). Thereafter dried nitrogen was blown through the mixture for about 45 minutes in order to remove unconsumed phosgene. 70 g. of approximately 30% strength aqueous methylamine solution were then added dropwise. In the course thereof the solution became increasingly less viscous. It was stirred for a further 2 hours and heated to the boil for a further 2 hours. All the solvent was then distilled off *in vacuo* and the residue was mixed with 600 ml. of water and triturated. The salt-free tacky residue was recrystallised from acetone and washed with a little petroleum ether. Yield: 23 g. of 1-(2-benzothiazolyl)-1-ethyl-3-methyl-urea in the form of white crystals of melting point 82–84° C.

Examples 2–6

The following compounds were prepared analogously:

| Cpd. No. | Structural formula | Melting point (° C) or boiling point (B.P.) |
|---|---|---|
| (2) | benzothiazole with C—N—CO—NH—CH₃, C₃H₇-n | 91–92 |
| (3) | benzothiazole with C—N—CO—NH—CH₃, C₄H₉-n | 98–99 |
| (4) | benzothiazole with C—N—CO—NH—CH₃, CH(H₃C)(C₂H₅) | 87–89 |
| (5) | benzothiazole with C—N—CO—N—CH₃, C₂H₅, CH₃ | 134–140 (B.P.₀.₂₂) |

The active compounds according to the invention display strong herbicidal properties and can therefore be used for combating weeds. By weeds, in the broadest sense, there are to be understood all plants which grow in locations where they are undesired. Whether the compounds according to the invention act as total or selective herbicides essentially depends on the amount used.

The compounds according to the invention can be employed, for example, in the case of the following plants: dicotyledons, such as mustard (*Sinapis*), cress (*Lepidium*), cleavers (*Galium*), chickweed (*Stellaria*), camomile (*Matricaria*), gallant soldier (*Galinsoga*), goosefoot (*Chenopodium*), annual nettle (*Urtica*), groundsel (*Senecio*), cotton (*Gossypium*), beets (*Beta*), carrots (*Daucus*), beans (*Phaseolus*), potatoes (*Solanum*), and coffee (*Coffea*); monocotyledons, such as timothy (*Phleum*), bluegrass (*Poa*), fescue (*Festuca*), goosegrass (*Eleusine*), foxtail (*Setaria*), ryegrass (*Lolium*), cheat (*Bromus*), barnyard grass (*Echinochloa*), maize (*Zea*), rice (*Oryza*), oats (*Avena*), barley (*Hordeum*), wheat (*Triticum*), millet (*Panicum*) and sugar cane (*Saccharum*).

The active compounds are particularly suitable for the selective combating of weeds in areas of cultivation of beets, grain, peas and beans.

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, e.g. aerosol propellants, such as halogenated hydrocarbons, e.g. Freon.

As solid diluents or carriers, there are preferably used ground natural minerals, such as kaolins, clays, talc, chalk, quartz, attapulgite, montmorillonite or diatomaceous earth, or ground synthetic minerals, such as highly dispersed silicic acid, alumina or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates, alkyl sulphates and aryl sulphonates; and preferred examples of dispersing agents include lignin, sulphite waste liquors and methyl cellulose.

The active compounds according to the invention can be present in the formulation as a mixture with other active compounds.

The formulations in general contain from 0.1 to 95 percent by weight of active compound, preferably 0.5 to 90 percent by weight.

The active compounds can be employed as such or in the form of their formulations or the use forms prepared therefrom, such as ready-to-use solutions, emulsions, suspensions, powders, pastes and granules. They may be applied in the customary way, for example by watering, spraying, atomising, dusting or sprinkling.

The active compounds according to the invention can be employed both according to the pre-emergence method and according to the post-emergence method, that is to say before or after emergence of the plants.

When using the active compounds according to the post-emergence method and the pre-emergence method, the amount used can be varied over a wide range. In general, it is from 0.5 to 15 kg. of active compound per hectare, preferably 1 to 5 kg. per hectare.

The active compounds according to the invention also display a fungicidal action.

The invention therefore provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or their habitat a compound according to the invention alone or in the form of a composition containing as active ingredient a compound according to the invention in admixture with a diluent or carrier.

The invention also provides methods of obtaining crops protected from damage by weeds by being grown in areas which, immediately prior to and or during the time of the growing, a compound according to the invention was applied alone or in admixture with a diluent or carrier. It will be seen that the usual methods of providing a harvested crop may be improved by the present invention.

The compounds of the invention and their preparation and use are illustrated by the following Examples.

Example A

Pre-emergence test/outdoors/spray powder

Inert carrier: 0.25 part by weight of kaolin
Protective colloid: 0.02 part by weight of ligninsulphonate
Dispersing auxiliary: 0.15 part by weight of hydroxyaryl-sulphonic acid-formaldehyde condensate In order to prepare an appropriate preparation of the active compound, 1 part by weight of active compound was mixed with the indicated amounts of formulation auxiliaries and the concentrate was diluted with water to the desired concentration.

Shortly after sowing the test plants outdoors, the individual plots were watered with the amount of the active compound preparation required for uniform wetting of the soil surface. The active compound concentration in the preparation does not matter, the only decisive factor being the amount of active compound used per unit area.

After 5 weeks the degree of damage of the test plants was determined and given the rating numbers 1–9, which have the meanings given in Table 1.

TABLE 1

| Rating No. | Weeds | | Crop plants | |
|---|---|---|---|---|
| | Degree of damage | Proportion of weeds still present, in percent relative to untreated | Degree of damage | Thinning-out effect |
| Positive/Negative: | | | | |
| 1 | Completely destroyed | No weeds present | No damage | All plants present. |
| 2 | 97.5% damage | 2.5% still present | 2.5% of a plant are damaged | 2.5% are missing. |
| 3 | 95% damage | 5% still present | 5% of a plant are damaged | 5% are missing. |
| 4 | 90% damage | 10% still present | 10% of a plant are damaged | 10% are missing. |
| 5 | 85% damage | 15% still present | 15% of a plant are damaged | 15% are missing. |
| 6 | 75% damage | 25% still present | 25% of a plant are damaged | 25% are missing. |
| 7 | 65% damage | 35% still present | 35% of a plant are damaged | 35% are missing. |
| 8 | 32.5% damage | 67.5% still present | 67.5% of a plant are damaged | 67.5% are missing. |
| 9 | No damage | All weeds present | Completely destroyed | 100% are missing. |

Example B

Post-emergence test/outdoors/spray powder

Inert carrier: 0.25 part by weight of kaolin
Protective colloid: 0.02 part by weight of ligninsulphonate
Dispersing auxiliary: 0.15 part by weight of hydroxyaryl-sulphonic acid-formal-dehyde condensate To prepare an appropriate preparation of active compound, 1 part by weight of active compound was mixed with the indicated amounts of formulation auxiliaries and the concentrate was subsequently diluted with water to the desired concentration.

Outdoor plots with test plants which were about 3 to 10 cm. high were sprayed with such amount of the active compound preparation as to give uniform wetting of the plants. The decisive factor is here the amount of active compound used per unit area.

After 3 weeks the degree of damage of the plants was determined and given the rating numbers 1–9, which have the same meanings as in Table 1.

The test results are given in Table 4.

TABLE 2.—PRE-EMERGENCE TEST/OUTDOORS

| Active compound | Amount of active compound used, kg./ha. | Soya beans | Cotton | Maize | Millet | Beans | Peas | Wheat | Barley | Beets | Oats | Stellaria | Chenopodium | Lamium | Urtica | Capsella | Mercurialis | Poa |
|---|---|---|---|---|---|---|---|---|---|---|---|---|---|---|---|---|---|---|
| (Compound A) (known) | 1.5 | | | 1 | 1 | 2 | 3 | 2 | 1 | 9 | 4 | 6 | 6 | 4 | 3 | 5 | 4 | 3 |
| | 3.0 | | | 3 | 3 | 3 | 5 | 4 | 4 | 9 | 6 | 2 | 1 | 1 | 1 | 1 | 2 | 1 |
| (Compound 1) | 1.5 | | | 1 | 1 | 1 | 1 | 1 | 1 | 5 | 1 | 3 | 3 | 3 | 3 | 1 | 1 | 2 |
| | 3.0 | | | 1 | 1 | 1 | 2 | 1 | 1 | 6 | 2 | 1 | 1 | 1 | 1 | 1 | 1 | 1 |

Active compound (Compound A, known): benzothiazole with structure $C-N-C(=O)-NH-CH_3$ with $CH_3$ substituent Active compound (Compound 1): benzothiazole with structure $C-N-C(=O)-NH-CH_3$ with $C_2H_5$ substituent

TABLE 3.—PRE-EMERGENCE TEST/OUTDOORS

| Active compound | Active compound applied, kg./ha. | Soya beans | Cotton | Earth nuts | Amaranthus blitoides | Mollugo verticilata | Eclipta alba | Panicum ramosum |
|---|---|---|---|---|---|---|---|---|
| (Compound 1) | 1.5 | 1 | 1 | 1 | 1 | 1 | 1 | 3 |
| | 3.0 | 1 | 1 | 3 | 1 | 1 | 1 | 2 |

Active compound (Compound 1): benzothiazole with structure $C-N-C(=O)-NH-CH_3$ with $C_2H_5$ substituent It will be understood that the specification and examples are illustrative but not limitative of the present invention and that other embodiments within the spirit and scope of the invention will suggest themselves to those skilled in the art.

What is claimed is:

1. 1-(2-Benzothiazolyl)-1-ethyl-3-methyl-urea.

References Cited
UNITED STATES PATENTS
2,756,135  7/1956  Searle _____ 260—305
3,725,428  4/1973  Janiak _____ 260—305

RICHARD J. GALLAGHER, Primary Examiner

U.S. Cl. X.R.

71—90

TABLE 4.—POST-EMERGENCE TEST/OUTDOORS

| Active compound | Amount of active compound used, kg./ha. | Maize | Millet | Beans | Peas | Wheat | Barley | Beets | Oats | Stellaria | Cheno- podium | Lamium | Capsella | Poa |
|---|---|---|---|---|---|---|---|---|---|---|---|---|---|---|
| (Compound A) (known) [benzothiazole-N(CH$_3$)-C(O)-NH-CH$_3$] | 1.5 / 3.0 | 1/3 | 1/4 | 1/5 | 1/4 | 3/5 | 2/5 | 3/9 | 3/6 | 2/1 | 5/1 | 4/2 | 2/1 | 2/1 |
| (Compound 1) [benzothiazole-N(C$_2$H$_5$)-C(O)-NH-CH$_3$] | 1.5 / 3.0 | 1/1 | 1/1 | 1/2 | 1/1 | 1/1 | 1/1 | 1/4 | 1/3 | 2/1 | 4/1 | 2/1 | 2/1 | 1/1 |